US010553112B2

(12) United States Patent
Gogic et al.

(10) Patent No.: US 10,553,112 B2
(45) Date of Patent: Feb. 4, 2020

(54) SAFETY EVENT MESSAGE TRANSMISSION TIMING IN DEDICATED SHORT-RANGE COMMUNICATION (DSRC)

(71) Applicant: QUALCOMM Incorporated, San Diego, CA (US)

(72) Inventors: Aleksandar Gogic, San Diego, CA (US); James Alan Misener, Pacifica, CA (US)

(73) Assignee: QUALCOMM Incorporated, San Diego, CA (US)

(*) Notice: Subject to any disclaimer, the term of this patent is extended or adjusted under 35 U.S.C. 154(b) by 122 days.

(21) Appl. No.: 15/233,637

(22) Filed: Aug. 10, 2016

(65) Prior Publication Data
US 2017/0053530 A1 Feb. 23, 2017

Related U.S. Application Data

(60) Provisional application No. 62/206,941, filed on Aug. 19, 2015.

(51) Int. Cl.
G08G 1/09 (2006.01)
G08G 1/0967 (2006.01)
(Continued)

(52) U.S. Cl.
CPC ....... G08G 1/096791 (2013.01); H04L 67/12 (2013.01); H04W 4/46 (2018.02); H04W 4/80 (2018.02)

(58) Field of Classification Search
CPC ........... G08G 1/096791; H04W 4/008; H04W 4/046; H04L 67/12
(Continued)

(56) References Cited

U.S. PATENT DOCUMENTS

2003/0143974 A1 7/2003 Navarro
2011/0128849 A1* 6/2011 Guo ...................... H04W 28/10
370/235
(Continued)

FOREIGN PATENT DOCUMENTS

WO 2013163218 A1 10/2013
WO 2014090131 A1 6/2014

OTHER PUBLICATIONS

McNew J., "On-board Minimum Performance Requirements for V2V Safety Systems," Surface Vehicle Standard, Draft 1.0 of SAE J2945/1, Feb. 26, 2015, pp. 1-59.
(Continued)

Primary Examiner — Dhaval V Patel
(74) Attorney, Agent, or Firm — Muncy, Geissler, Olds & Lowe, P.C.

(57) ABSTRACT

Techniques for transmitting vehicle information messages among a plurality of vehicles are disclosed. In an aspect, a transceiver of a vehicle transmits a first set of vehicle information messages over a wireless medium at a first periodic rate, the first set of vehicle information messages including information related to the vehicle. One or more sensors of the vehicle detect an event related to operation of the vehicle. A processor of the vehicle generates a second set of vehicle information messages each including an event flag and information about the event, the event flag indicating that the second set of vehicle information messages is reporting the event. The transceiver of the vehicle transmits a first vehicle safety message of the second set of vehicle information messages over the wireless medium as soon as the first vehicle safety message is generated.

34 Claims, 8 Drawing Sheets

(51) Int. Cl.
*H04W 4/80* (2018.01)
*H04W 4/46* (2018.01)
*H04L 29/08* (2006.01)

(58) Field of Classification Search
USPC .......................................................... 340/905
See application file for complete search history.

(56) References Cited

U.S. PATENT DOCUMENTS

| | | | |
|---|---|---|---|
| 2013/0279392 A1* | 10/2013 | Rubin | H04W 72/005 370/312 |
| 2014/0370801 A1 | 12/2014 | Yang et al. | |
| 2015/0148985 A1 | 5/2015 | Jo | |
| 2015/0305038 A1* | 10/2015 | Du | H04W 48/12 370/329 |
| 2016/0335897 A1* | 11/2016 | Naserian | G08G 1/161 |

OTHER PUBLICATIONS

International Search Report and Written Opinion—PCT/US2016/046499—ISA/EPO—dated Nov. 4, 2016.
McNew J., "EDCA parameters for Wave," IEEE 802.11 11-07-0718, May 14, 2007, Slide 1-Slide 20.

* cited by examiner

SAFETY EVENT MESSAGE TRANSMISSION TIMING IN DEDICATED SHORT-RANGE COMMUNICATION (DSRC)

CROSS-REFERENCE TO RELATED APPLICATIONS

The present Application for Patent claims the benefit of U.S. Provisional Application No. 62/206,941, entitled "SAFETY EVENT MESSAGE TRANSMISSION TIMING IN DEDICATED SHORT-RANGE COMMUNICATION (DSRC)," filed Aug. 19, 2015, assigned to the assignee hereof, and expressly incorporated herein by reference in its entirety.

INTRODUCTION

Aspects of this disclosure relate generally to wireless communications, and more particularly to safety event message transmission timing in Dedicated Short-Range Communication (DSRC).

Wireless communication systems are widely deployed to provide various types of communication content, such as voice, data, multimedia, and so on. Typical wireless communication systems are multiple-access systems capable of supporting communication among multiple devices by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as 802.11 provided by the Institute of Electrical and Electronics Engineers (IEEE), Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), etc.

In the United States, the U.S. Department of Transportation is working to implement the Dedicated Short-Range Communication (DSRC) communication link to support Intelligent Transportation Systems (ITS) applications, such as wireless communications between high-speed vehicles (Vehicle-to-Vehicle (V2V)) and between vehicles and the roadside infrastructure (Vehicle-to-Infrastructure (V2I)). DSRC can be used for applications such as vehicle safety services, self-driving functionality, commerce transactions via a vehicle, etc.

DSRC uses the Wireless Access for Vehicular Environments (WAVE) protocol, also known as IEEE 802.11p, for V2V and V2I communications. IEEE 802.11p is an approved amendment to the IEEE 802.11 standard and operates in the licensed ITS band of 5.9 GHz (5.85-5.925 GHz).

In Europe, 802.11p was used as a basis for the ITS-G5 standard, supporting the V2V and V2I communications. The European Commission has allocated part of the 5.9 GHz band for priority road safety applications and V2V and V2I communications. The intention is to ensure compatibility with the U.S. even if the allocation is not exactly the same by using frequencies that are sufficiently close so that the same antenna and radio transceiver can be used.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method for transmitting vehicle information messages among a plurality of vehicles includes transmitting, by a transceiver of a vehicle of the plurality of vehicles, a first set of vehicle information messages over a wireless medium at a first periodic rate, the first set of vehicle information messages including information related to the vehicle, detecting, by one or more sensors of the vehicle, an event related to operation of the vehicle, generating, by at least one processor of the vehicle, a second set of vehicle information messages each including an event flag and information about the event, the event flag indicating that the second set of vehicle information messages is reporting the event, and transmitting, by the transceiver of the vehicle, a first vehicle information message of the second set of vehicle information messages over the wireless medium as soon as the first vehicle information message is generated.

An apparatus for transmitting vehicle information messages among a plurality of vehicles includes a transceiver of a vehicle of the plurality of vehicles configured to transmit a first set of vehicle information messages over a wireless medium at a first periodic rate, the first set of vehicle information messages including information related to the vehicle, one or more sensors of the vehicle configured to detect an event related to operation of the vehicle, and at least one processor of the vehicle configured to generate a second set of vehicle information messages each including an event flag and information about the event, the event flag indicating that the second set of vehicle information messages is reporting the event, wherein the transceiver of the vehicle is further configured to transmit a first vehicle information message of the second set of vehicle information messages over the wireless medium as soon as the first vehicle information message is generated.

An apparatus for transmitting vehicle information messages among a plurality of vehicles includes means for transmitting configured to transmit a first set of vehicle information messages over a wireless medium at a first periodic rate, the first set of vehicle information messages including information related to the vehicle, means for sensing configured to detect an event related to operation of the vehicle, and means for processing configured to generate a second set of vehicle information messages each including an event flag and information about the event, the event flag indicating that the second set of vehicle information messages is reporting the event, wherein the means for transmitting is further configured to transmit a first vehicle information message of the second set of vehicle information messages over the wireless medium as soon as the first vehicle information message is generated.

A non-transitory computer-readable medium storing computer executable code for transmitting vehicle information messages among a plurality of vehicles includes code to cause a transceiver of a vehicle of the plurality of vehicles to transmit a first set of vehicle information messages over a wireless medium at a first periodic rate, the first set of vehicle information messages including information related to the vehicle, cause one or more sensors of the vehicle to report an event related to operation of the vehicle, cause at least one processor of the vehicle to generate a second set of vehicle information messages each including an event flag and information about the event, the event flag indicating that the second set of vehicle information messages is reporting the event, and cause the transceiver of the vehicle to transmit a first vehicle information message of the second set of vehicle information messages over the wireless medium as soon as the first vehicle information message is generated.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
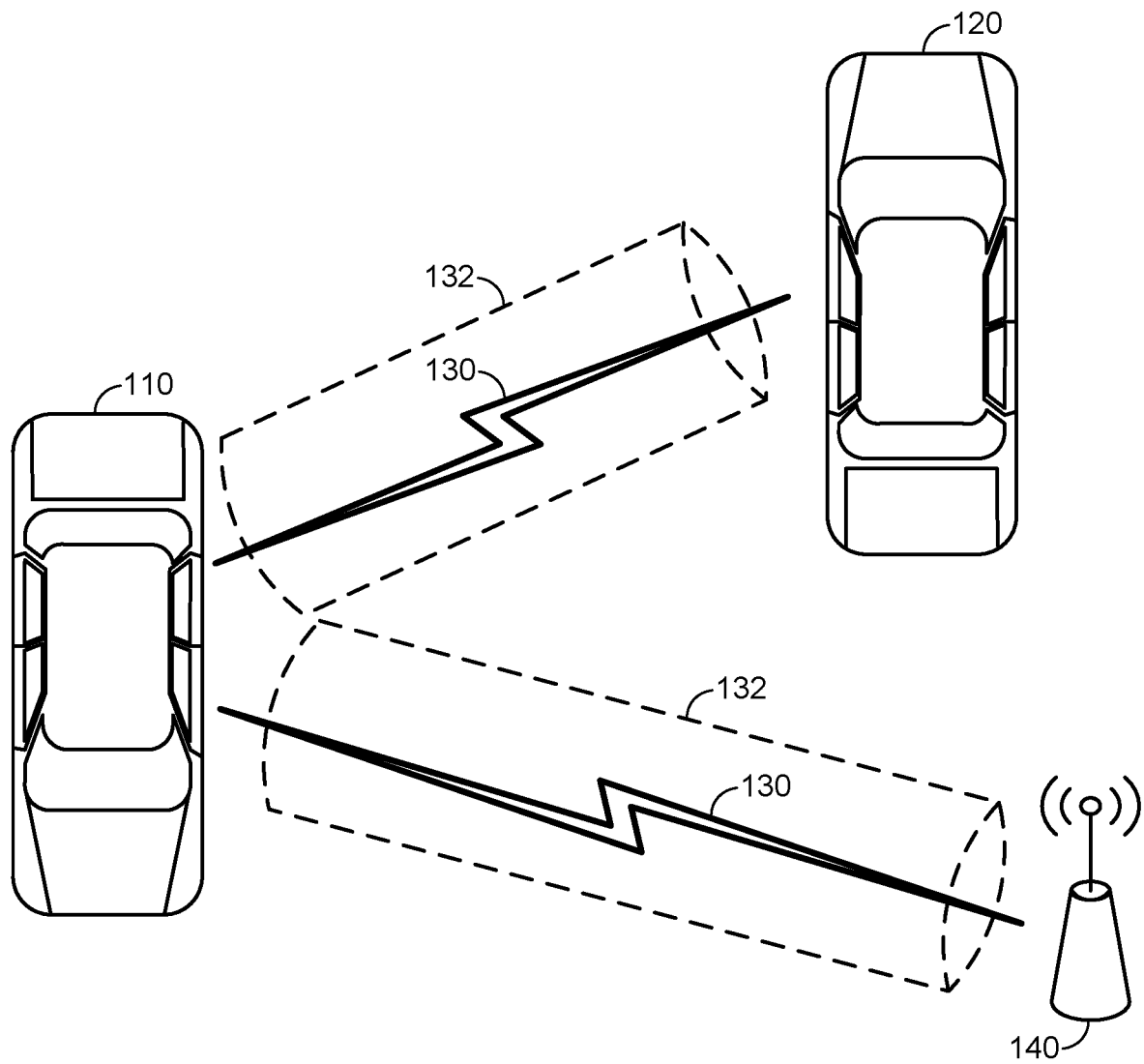
FIG. 1 illustrates an example wireless communication system including a vehicle in communication with one or more other vehicles and one or more roadside access points according to at least one aspect of the disclosure.

Techniques for transmitting vehicle information messages among a plurality of vehicles are disclosed. In an aspect, a transceiver of a vehicle of the plurality of vehicles transmits a first set of vehicle information messages over a wireless medium at a first periodic rate, the first set of vehicle information messages including information related to the vehicle. Subsequently, one or more sensors of the vehicle detect an event related to operation of the vehicle. In response, at least one processor of the vehicle generates a second set of vehicle information messages each including an event flag and information about the event, the event flag indicating that the second set of vehicle information messages is reporting the event. The transceiver of the vehicle then transmits a first vehicle information message of the second set of vehicle information messages over the wireless medium as soon as the first vehicle information message is generated.

These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As noted in the Background section, in the United States, the U.S. Department of Transportation is working to implement the Dedicated Short-Range Communication (DSRC) communication link to support Intelligent Transportation Systems (ITS) applications, such as wireless communications between high-speed vehicles (Vehicle-to-Vehicle (V2V)) and between vehicles and the roadside infrastructure (Vehicle-to-Infrastructure (V2I)). The DSRC system is being developed with the aim to require vehicles to transmit short range messages to each other, informing other vehicles in the vicinity about position, speed, acceleration, heading, and other vehicle data. A vehicle receiving such messages can warn the driver to avoid potential collisions, or in more advanced implementations, can automatically trigger an evasive action for that purpose. For example, if another vehicle is entering an intersection ahead at high speed or approaching in an adjacent lane in a blind spot, the first vehicle will receive V2V messages from the other vehicle, enabling the first vehicle to take any necessary evasive action. As another example, when self-driving (automated) vehicles are driving in close or platoon formation, these messages are also used nominally for control. They are part of a tight control loop, where time is critical.

FIG. 1 illustrates an example wireless communication system including a vehicle 110 in communication with one or more other vehicles 120 and one or more roadside access points 140. In the example of FIG. 1, the vehicle 110 may transmit and receive messages with the one or more vehicles 120 and the one or more roadside access points 140 via a wireless link 130. The wireless link 130 may operate over a communication medium of interest, shown by way of example in FIG. 1 as the medium 132, which may be shared with other communications between other vehicles/infrastructure access points, as well as other RATs.

DSRC uses the Wireless Access for Vehicular Environments (WAVE) protocol, also known as IEEE 802.11p, for V2V and V2I communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, referring to FIG. 1, as a particular example, the medium 132 may correspond to at least a portion of the licensed ITS frequency band of 5.9 GHz.

Communications between the vehicles 110/120 are referred to as V2V communications and communications between the vehicle 110 and the one or more roadside access point 140 are referred to as V2I communications. As noted above, the V2V communications between vehicles 110/120 may include information about the position, speed, acceleration, heading, and other vehicle data of the vehicles 110/120. The V2I information received at the vehicle 110 from the one or more roadside access points 140 may include road rules, parking automation information, etc.

Figure 2:
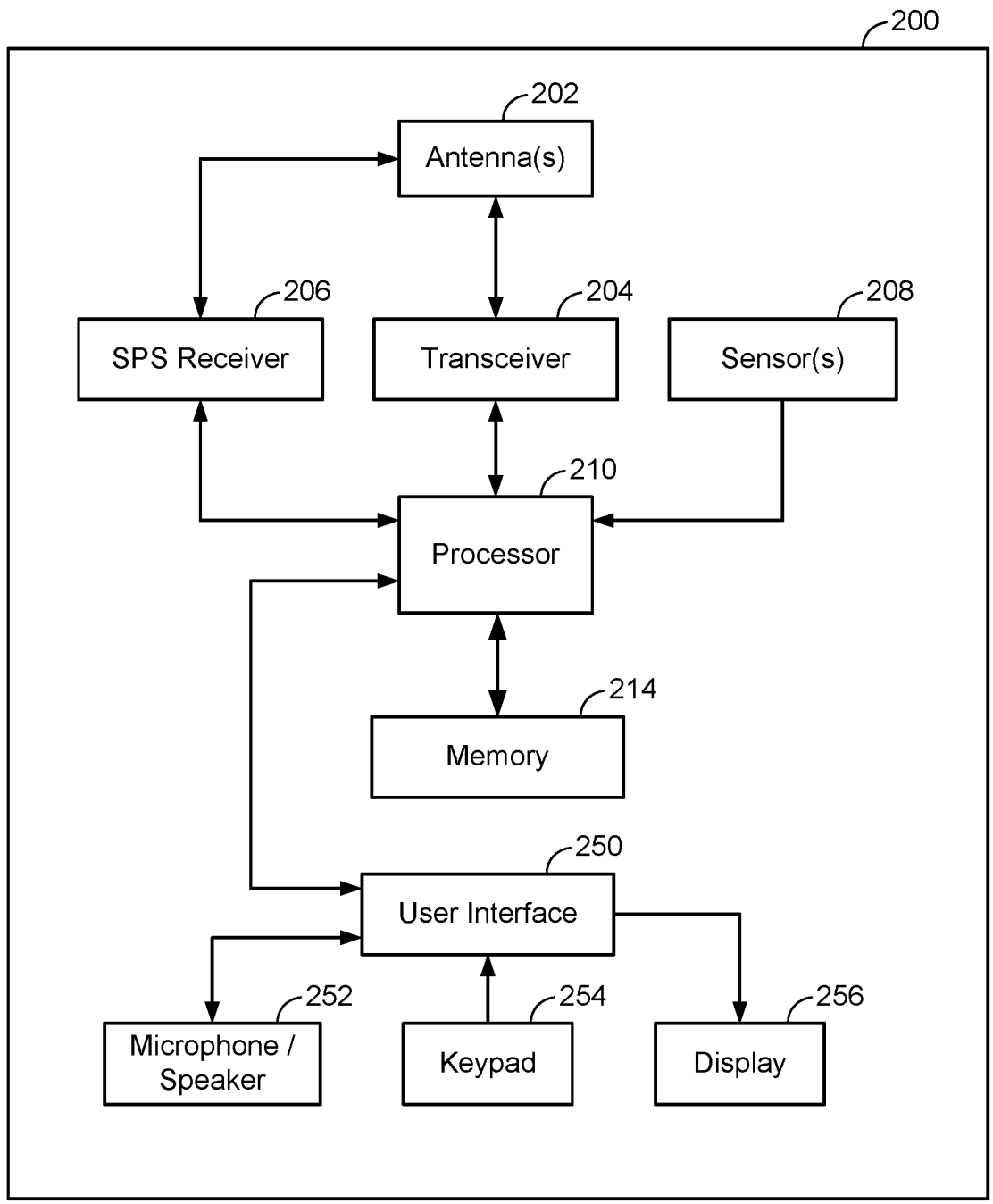
FIG. 2 is a block diagram illustrating various components of an exemplary vehicle according to at least one aspect of the disclosure.

FIG. 2 is a block diagram illustrating various components of an exemplary vehicle 200, which may correspond to vehicle 110 and/or vehicle 120 in FIG. 1. The vehicle 200 may include at least one transceiver 204 (e.g., a DSRC transceiver) connected to one or more antennas 202 for communicating with other network nodes, e.g., other vehicles, infrastructure access points (e.g., the one or more roadside access points 140), etc., via at least one designated radio access technology (RAT), e.g., IEEE 802.11p, over the medium 132. The transceiver 204 may be variously configured for transmitting and encoding signals (e.g., messages, indications, information, and so on), and, conversely, for receiving and decoding signals (e.g., messages, indications, information, pilots, and so on) in accordance with the designated RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The vehicle 200 may also include a satellite positioning service (SPS) receiver 206. The SPS receiver 206 may be connected to the one or more antennas 202 for receiving satellite signals. The SPS receiver 206 may comprise any suitable hardware and/or software for receiving and processing SPS signals. The SPS receiver 206 requests information and operations as appropriate from the other systems, and performs the calculations necessary to determine the vehicle's 200 position using measurements obtained by any suitable SPS algorithm.

One or more sensors 208 may be coupled to a processor 210 to provide information related to the state and/or environment of the vehicle 200, such as speed, headlight status, gas mileage, etc. By way of example, the one or more sensors 208 may include an accelerometer (e.g., a microelectromechanical systems (MEMS) device), a gyroscope, a geomagnetic sensor (e.g., a compass), an altimeter (e.g., a barometric pressure altimeter), etc.

The processor 210 may include one or more microprocessors, microcontrollers, and/or digital signal processors that provide processing functions, as well as other calculation and control functionality. The processor 210 may include any form of logic suitable for performing at least the techniques provided herein.

The processor 210 may also be coupled to a memory 214 for storing data and software instructions for executing programmed functionality within the vehicle 200. The memory 214 may be on-board the processor 210 (e.g., within the same integrated circuit (IC) package), and/or the memory 214 may be external to the processor 210 and functionally coupled over a data bus.

The vehicle 200 may include a user interface 250 that provides any suitable interface systems, such as a microphone/speaker 252, keypad 254, and display 256 that allows user interaction with the vehicle 200. The microphone/speaker 252 provides for voice communication services with the vehicle 200. The keypad 254 comprises any suitable buttons for user input to the vehicle 200. The display 256 comprises any suitable display, such as, for example, a backlit LCD display, and may further include a touch screen display for additional user input modes.

In the Safety Channel described above, each vehicle, such as vehicle 200, periodically broadcasts the Basic Safety Message (BSM), known also in similar systems (e.g., Europe) as the Cooperative Awareness Message (CAM), to provide information about the vehicle. Other systems may also exist for providing vehicular safety messages that may or may not implement the techniques described herein (e.g., China and Japan vehicle messaging systems). To manage access contention, Enhanced Distributed Channel Access (EDCA), standardized in IEEE 802.11, is used.

BSMs are described in the "Surface Vehicle Standard," SAE J2735, published by SAE International in 2015, which is incorporated herein in its entirety. Each BSM includes the BSM Part I message and the BSM Part II DF_VehicleSafetyExtension data frames, DF_PathHistory, and DF_PathPrediction. Each BSM includes the BSM Part II DF_VehicleSafetyExtension data element and DE_EventFlags only as long as an event is active. This data element is not included in a BSM unless at least one event flag is active, i.e., set to "1." Each BSM may optionally include the BSM Part II DF_VehicleSafetyExtension data frame and DF_RTCMPackage. Table 1 illustrates the data elements (DE) and/or data fields (DF) that can be transmitted in a BSM.

TABLE 1

| BSM Data Elements/Fields | |
|---|---|
| Req. Number | Data Element/Field |
| BSM Part I | DE_DSRCMsgID |
| | DE_MsgCount |
| | DE_TemporaryID |
| | DE_Dsecond |
| | DE_Latitude |
| | DE_Longitude |
| | DE_Elevation |
| | DF_PositionalAccuracy |
| | DF_TransmissionAndSpeed |
| | DE_Speed |
| | DE_TransmissionState |
| | DE_Heading |
| | DE_SteeringWheelAngle |
| | DF_AccelerationSet4Way |
| | DE_Acceleration (Longitudinal) |
| | DE_Acceleration (Lateral) |
| | DE_VerticalAcceleration |
| | DE_YawRate |
| | DF_BrakeSystemStatus |
| | DF_VehicleSize |
| | DE_VehicleWidth |
| | DE_VehicleLength |
| BSM Part II | DE_EventFlags |
| | DF_PathHistory |
| | DF_PathPrediction |
| | DF_RTCMPackage |

Aside from "routine" information about vehicle position and other data carried in the BSM Part I message, the BSM can transmit information about safety related "events" in the BSM Part II DF_VehicleSafetyExtension data frames, for example, hard braking actions, that can be used to inform the driver of the receiving vehicle about the event and/or to allow the receiving vehicle to perform automated operations in response to the event, such as automatic braking, steering, and/or throttling for collision avoidance. When the DE_EventFlag is not active, the nominal rate at which BSMs are broadcast is 10 Hz (i.e., 10 times per second). When transmitting at the default message rate of 10 Hz, BSMs are transmitted every 100 ms plus or minus a random value between 0 and 5 ms. After an initial BSM reporting a safety event, i.e., having the DE_EventFlag set to "1," subsequent BSMs, which may still have the DE_EventFlag set to "1" (as a safety event may last for several seconds), continue to be transmitted at a nominal rate of 10 Hz.

Safety related events are not periodic, and are typically rare. Broadcasting the BSM periodically means that the occurrence a safety event will be conveyed to other vehicles with some delay, which can be up to the BSM periodicity of 100 ms nominally, or 50 ms on average. That is, because a vehicle typically transmits BSMs 10 times per second, there is a 100 ms gap between BSMs, and thus the longest delay between a safety event and the time it is reported in a BSM is 100 ms. However, because safety events can occur at any point during a 100 ms period, on average, a safety event will be reported within 50 ms of occurring.

There are two factors that can increase this nominal delay time. First, in case of Safety Channel congestion (e.g., from a high density of vehicles in an area), the rate at which BSMs are transmitted is decreased, thereby increasing the periodicity of the BSMs. The delays caused by the increased periodicity can double, triple, or more, for example, from 100 ms to 300 ms or more. Second, EDCA causes some idle time between transmissions, which can range from a few dozen microseconds to several milliseconds, depending on the value of the parameters chosen, e.g., the arbitration interframe space number (AIFSN), minimum contention window ($CW_{min}$), and maximum contention window ($CW_{max}$).

Conventionally, "routine" BSMs use EDCA parameters of the second highest priority (i.e., user priority 4 and 5), while BSMs carrying "event" flags (i.e., a BSM with the DE_EventFlag set to "1") use EDCA parameters of the highest priority (i.e., user priority 6 and 7). Table 2 illustrates the EDCA parameter set in IEEE 802.11. In Table 2, AC_BK is the background access class, AC_BE is the best effort access class, AC_VI is the video access class, and AC_VO is the voice access class.

TABLE 2

EDCA Parameters

| User Priority | AC | CWmin | CWmax | AIFSN | TXOP Limit OFDM/CCKOFDM PHY |
|---|---|---|---|---|---|
| 1, 2 | AC_BK | 15 | 1023 | 9 | 0 |
| 0, 3 | AC_BE | 15 | 1023 | 4 | 0 |
| 4, 5 | AC_VI | 7 | 15 | 3 | 0 |
| 6, 7 | AC_VO | 3 | 7 | 2 | 0 |

Table 3 illustrates only the EDCA parameters $CW_{min}$, $CW_{max}$, and AIFSN for both routine and event BSMs:

TABLE 3

EDCA Parameters for routine and event BSMs

| Priority | $CW_{min}$ | $CW_{max}$ | AIFSN |
|---|---|---|---|
| Routine BSMs | 7 | 15 | 3 |
| "Event" BSMs | 3 | 7 | 2 |

Figure 3:
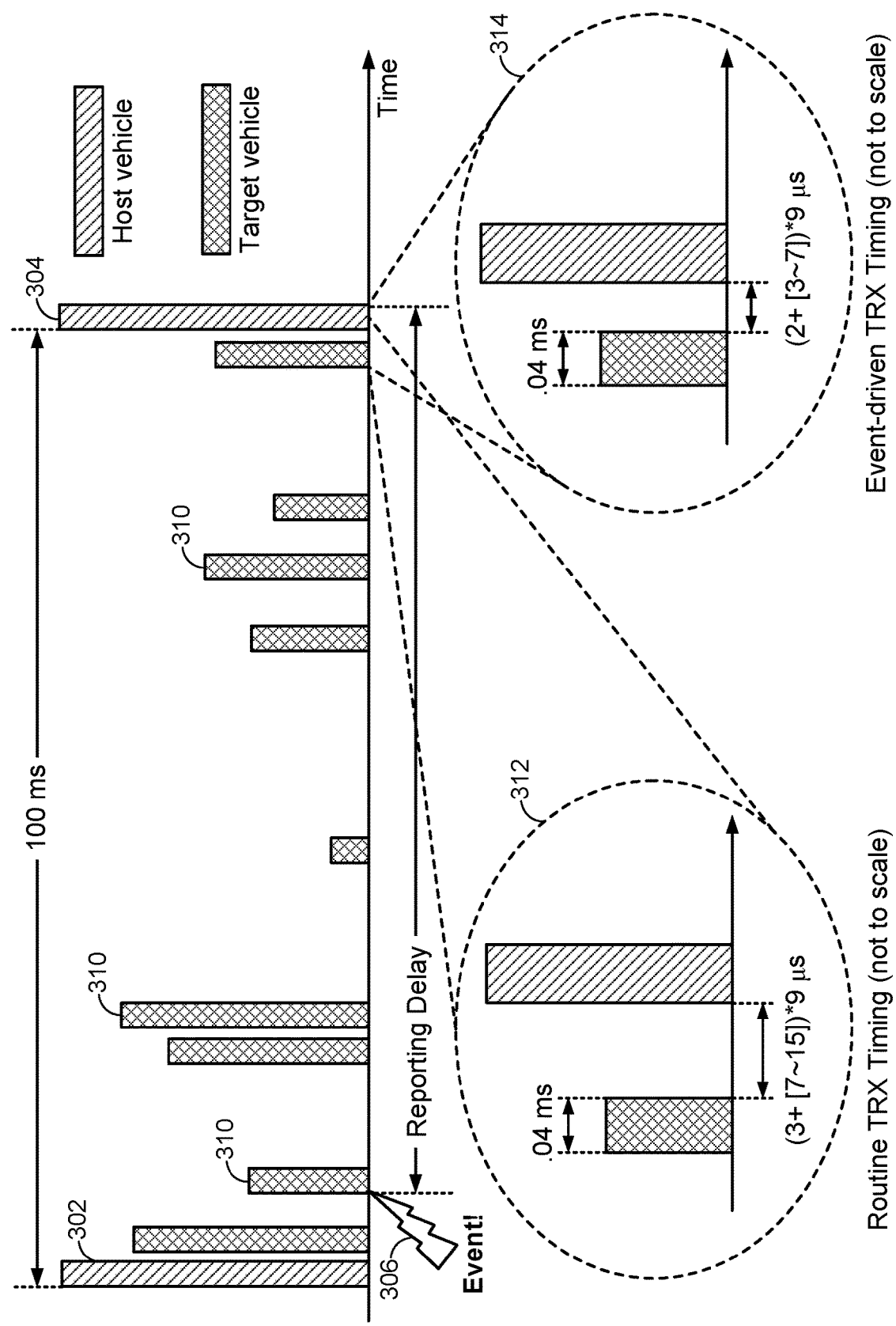
FIG. 3 is a diagram illustrating the conventional timing of Basic Safety Message (BSM) transmissions.

FIG. 3 is a diagram illustrating the conventional timing of BSM transmissions. The timing diagram illustrated in FIG. 3 begins with a host vehicle, such as vehicle 200, transmitting a routine BSM at 302 on a shared medium, such as medium 132 in FIG. 1. The host vehicle will not transmit another BSM for approximately 100 ms (at 304), during which time the host vehicle receives BSMs from other nearby vehicles on the shared medium. In FIG. 3, the transmissions on the shared medium from nearby vehicles are represented by the reference number 310. That is, vehicles both transmit and receive on the same shared medium, or channel. In the example of FIG. 3, shortly after the host vehicle transmits the first BSM at 302, a safety event occurs at 306. However, the host vehicle must wait until the next BSM opportunity at 304 to report this safety event.

FIG. 3 also illustrates the timing between routine BSMs from different vehicles. As shown in call-out 312, transmission of a BSM lasts for 4 ms, followed by a gap of (3+(7 to 15)×9)µs before the next BSM is transmitted, where "3" is the AIFSN, "7" is the $CW_{min}$, and "15" is the $CW_{max}$. In the case of a safety event, however, the gap between BSM transmissions is (2+(3 to 7)×9)µs, as shown in call-out 314, where "2" is the AIFSN, "3" is the $CW_{min}$, and "7" is the $CW_{max}$. The difference in the length of the gap is due to the event BSMs being transmitted using EDCA parameters of the highest priority and routine BSMs being transmitted using EDCA parameters of the second highest priority.

It would be beneficial to (1) minimize BSM latencies, (2) maximize channel utilization (and thereby system capacity), and (3) permit higher priority BSMs (e.g., those indicating "safety events") to be received faster than "routine" BSMs. Criteria (2) leads to selecting values for the EDCA parameters that are as low as possible (e.g., the least amount of backoff between transmissions). Criteria (3) has been addressed as discussed above by classifying routine BSMs to a lower EDCA priority class (e.g., higher values for $CW_{min}$ and $CW_{max}$), and BSMs carrying information on safety events to the highest EDCA priority class. However, as described below, this is not the most optimal design.

Rather, the present disclosure provides a mechanism in which differentiation of latency performance between "routine" BSMs and "high priority" BSMs carrying safety event flags is not achieved using EDCA parameters, as described above. Using EDCA parameters can make a rather small differentiation between the two classes of messages. It also carries with it a penalty of lesser channel utilization than is otherwise achievable, since a vast majority of "routine" BSMs have higher inter-message gaps between them, as illustrated by call-out 312 in FIG. 3.

Instead of EDCA parameter differentiation, in the present disclosure, if a vehicle is experiencing a "safety event," such as a hard braking event, the vehicle does not wait for its nominal transmission slot (e.g., up to 100 ms under non-congested conditions or higher under channel congested conditions) to transmit the next BSM containing the DE_EventFlag and the DF_VehicleSafetyExtension data frames for the event. Rather, the vehicle may transmit the event BSM immediately, or as soon as the channel (e.g., medium 132) is available. Alternatively, the vehicle may, for a brief period of time, transmit at some reduced inter-BSM gap (e.g., 50 ms instead of 100 ms), particularly if the channel is congested and the inter-BSM gap is increased (e.g., above 100 ms). In that case, the vehicle resumes normal BSM transmission (e.g., every 100 ms, or the increased periodicity in the case of channel congestion) after the event is discontinued, for example, after the hard braking event ends.

This immediate or near-immediate transmission of event-related BSMs is particularly relevant when collision avoidance—that is, automated braking, steering, and throttling—is invoked. Similarly, because V2V and V2I communication is used for self-driving (automated) vehicles, and the required latencies are shorter, the near-immediate transmission of event-related BSMs is significant. For instance, while driver brake reaction time (i.e., the time from the driver perceiving a "target vehicle" threat to braking) can exceed one second, and thus the incremental gains in EDCA parameter changes may not be significant where the driver remains in control of the vehicle, when vehicles are automated—and especially when they follow in close or platoon formation—then the immediate or near-immediate transmission of event-related BSMs becomes significant. It should be noted that even though BSMs are referred to as "safety messages," for automated vehicles, these messages are also used for control and are part of a tight control loop in which time is critical.

Figure 4:
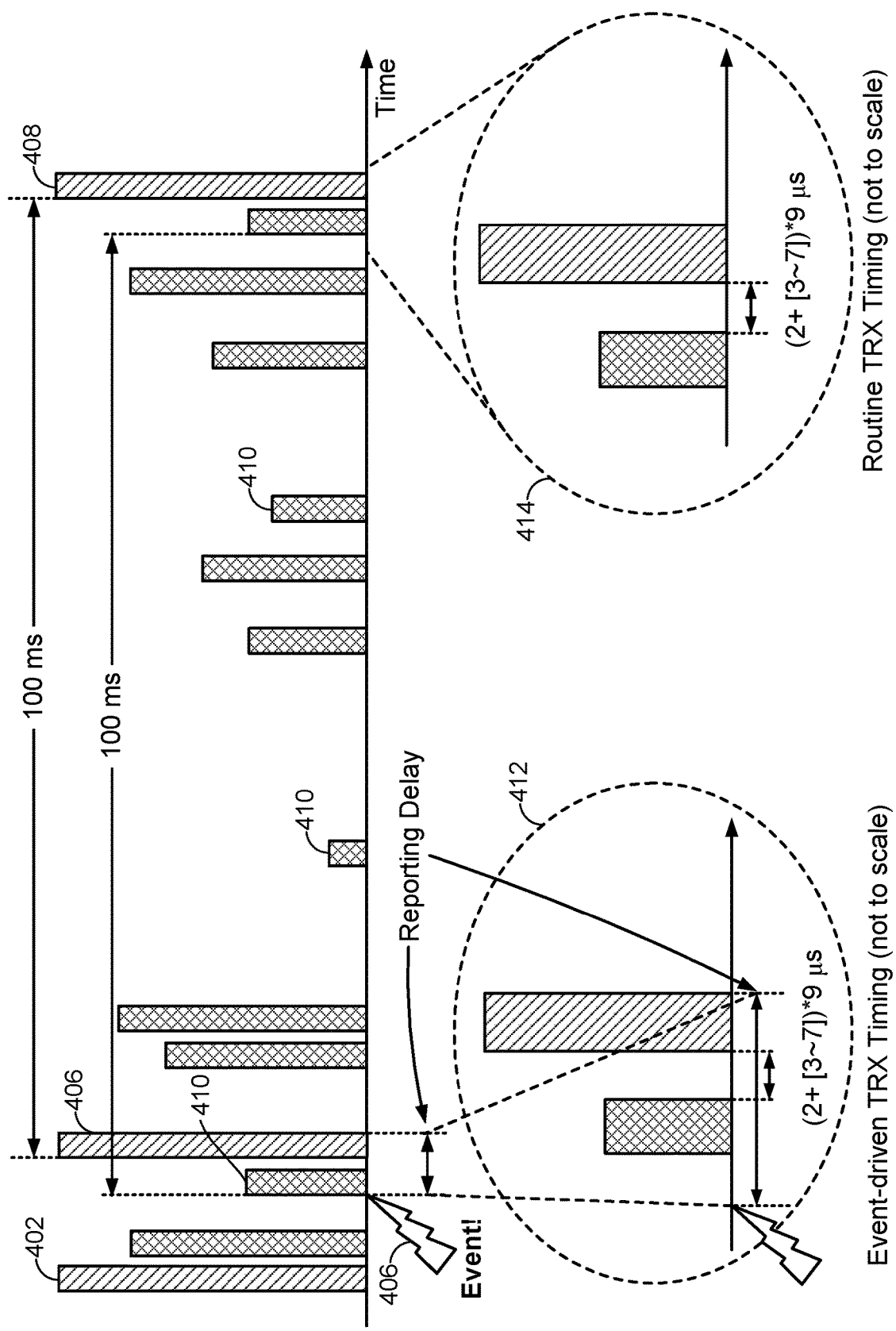
FIG. 4 is a diagram illustrating the timing of BSM transmissions according to at least one aspect of the disclosure.

FIG. 4 is a diagram illustrating the timing of BSM transmissions according to at least one aspect of the disclosure. The timing diagram illustrated in FIG. 4 begins with a host vehicle, such as vehicle 200, transmitting a routine BSM at 402 on a shared medium (e.g., medium 132). In the present disclosure, "routine" BSMs are still nominally transmitted every 100 ms, as described above. Thus, the host vehicle would not typically transmit another BSM for approximately 100 ms, during which time it receives BSMs from other nearby vehicles on the shared medium. In FIG. 4, the transmissions on the shared medium from nearby vehicles are represented by the reference number 410. That is, vehicles both transmit and receive on the same shared medium, or channel.

However, in the example of FIG. 4, shortly after the host vehicle transmits the routine BSM at 402, a safety event occurs at 404. Rather than waiting almost 100 ms until the next BSM opportunity to report this safety event, the host vehicle can transmit an "event" BSM (i.e., a BSM with the DE_EventFlag set to "1") at 406 as soon as the channel (e.g., medium 132) is available. The host vehicle will then resume transmitting BSMs approximately every 100 ms (shown at 408), regardless of whether the DE_EventFlag is still set to "1" (which it may be if the safety event at 404 is still ongoing at 408). Alternatively, the host vehicle can transmit the remaining BSMs related to the safety event at a higher frequency than every 100 ms.

FIG. 4 also illustrates the timing between BSMs from different vehicles. In the present disclosure, all BSMs, whether "routine" or "event" driven, use the highest priority EDCA parameters. Thus, as shown in call-out 412, the gap between routine BSMs is (2+(3 to 7)×9)μs, where "2" is the AIFSN, "3" is the $CW_{min}$, and "7" is the $CW_{max}$. Similarly, as shown in call-out 414, the gap between event BSMs is also (2+(3 to 7)×9)μs.

Note that although the vehicle can wait until the shared medium/channel is available to transmit the BSMs related to a safety event, this is not necessary. Rather, the vehicle can transmit such BSMs immediately. If the medium is not available, the transmissions may be lost or interfere with other transmissions. To address this issue, the vehicle can retransmit the BSMs related to the safety event some threshold number of times (optionally in quick succession) to increase the likelihood that they are received by nearby vehicles.

It should be noted that this deviation from the normal message cadence does not significantly disrupt the workings of the system, though it does result in a small transitional added load on the channel. Considering that safety events, such as hard braking events, are rare, and typically, in a given area and instance, only occur for a small percentage of vehicles, this small transitional effect has an insignificant impact on the timeliness of BSMs from other vehicles. Likewise, from the standpoint of the performance of EDCA, a vehicle that experiences a safety event transmits its BSM sooner than its nominal allocated time. However, since transmissions from all vehicles are uniformly distributed in time, the delay experienced by the subject vehicle due to EDCA is not impacted.

The mechanism of the present disclosure (1) results in better channel utilization and improved DSRC system capacity and (2) considerably reduces the latency in the safety event triggered BSM received by surrounding vehicles, giving them more time to react, and thereby reducing the chance of a traffic accident. This reduction of latency can be 100 ms for the nominal case (i.e., when there is no congestion), up to several hundreds of milliseconds if the channel is congested.

Figure 5A:
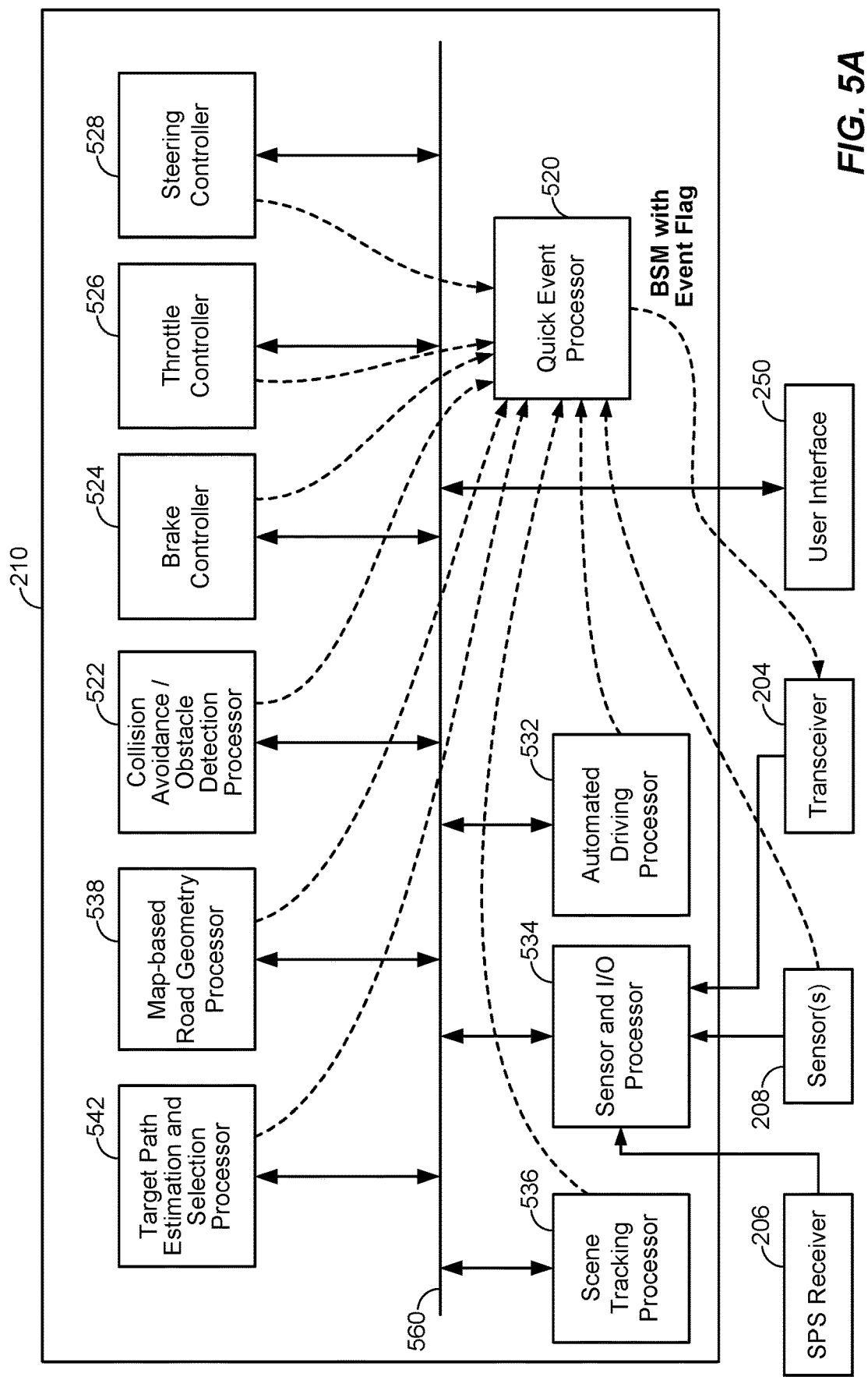
FIG. 5A illustrates various components of the vehicle of FIG. 2 in greater detail, where the transceiver transmits an event BSM to another vehicle.

FIG. 5A illustrates various components of the vehicle 200 of FIG. 2 in greater detail. In the example of FIG. 5A, the processor 210 includes a number of sub-processors and controllers, specifically, a quick event processor 520, a collision avoidance/obstacle detection processor 522, a brake controller 524, a throttle controller 526, a steering controller 528, an automated driving processor 532, a sensor and I/O processor 534, a scene tracking processor 536, a map-based road geometry processor 538, and a target path estimation and selection processor 542 communicatively coupled via a controller area network (CAN) bus 560.

In the example of FIG. 5A, any or a combination of the sensor(s) 208, the collision avoidance/obstacle detection processor 522, the brake controller 524, the throttle controller 526, the steering controller 528, the automated driving processor 532, the scene tracking processor 536, the map-based road geometry processor 538, and the target path estimation and selection processor 542 may detect a safety event, such as a hard braking event, and provide information about the event to the quick event processor 520. The quick event processor 520 may generate an event BSM including information about the detected safety event and pass it to the transceiver 204. The transceiver 204 may immediately, or as soon as the medium 132 is available, transmit the generated event BSM, as described above with reference to FIG. 4.

Figure 5B:
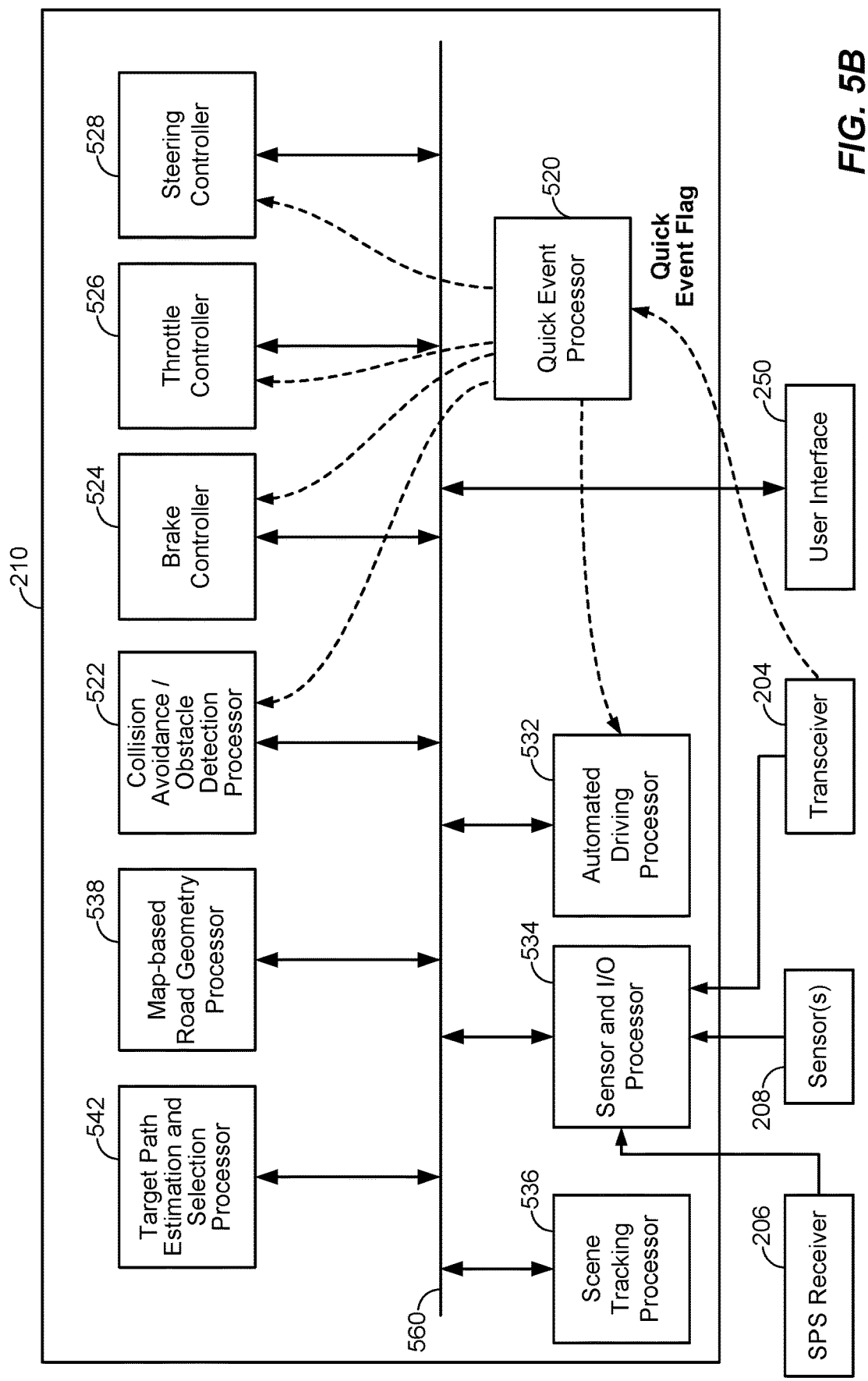
FIG. 5B illustrates the components of vehicle illustrated in FIG. 5A, where the transceiver receives an event BSM from another vehicle.

FIG. 5B illustrates the components of vehicle 200 illustrated in FIG. 5A, where the transceiver 204 receives an event BSM from another vehicle.

The present disclosure features the inclusion of an EDCA-accelerated Quick Event Flag (QEF), which is event-driven (i.e., generated upon reception of an event BSM) and connects with a quick event processor 520. The quick event processor 520 has two functions: to run preset commands to the brake, throttle and/or steering controllers 524-528 and to inform the collision avoidance/obstacle detection processor 522 and the automated driving processor 532. This communication bypasses the delay inherent in the current architecture. Specifically, sending quick event processor 520 commands to the collision avoidance/obstacle detection and automated driving processors 522 and 532 in addition to the brake, throttle and/or steering controllers 524-528 allows: (i) emergency or automated vehicle actuation that bypasses the CAN bus 560 and (ii) transition to normal operations, since simultaneous communication of quick event processor 520 commands to these other processors would enable them to recognize and implement post-event trajectory commands after the "safety event" is over.

Referring to FIG. 5B, the transceiver 204 receives a BSM with the DE_EventFlag set to "1." The transceiver 204 converts the event BSM to a Quick Event Flag and transmits it to the quick event processor 520. The quick event processor 520 sends preset commands to the brake, throttle and/or steering controllers 524-528 as necessary to react to the safety event and informs the collision avoidance/obstacle detection and automated driving processors 522 and 532 that it did so.

The system illustrated in FIG. 5B is pertinent to vehicles that are equipped with DSRC transceivers, such as transceiver 204, and benefits will be realized with (i) increasing levels of vehicle driving automation, (ii) a growing reliability of the DSRC communications input, (iii) the proliferation of automated collision avoidance and emergency intervention algorithms, and (iv) the expected advent of self-driving cars with decreasing following distances and times (e.g., "platooning" or cooperative vehicles).

The modules shown in FIGS. 5A and 5B may be processors coupled to the processor 210, Electronic Control Units (ECUs), processes that can be embedded in processor 210 as a system on a chip (SOC), or the like. Alternatively, in certain implementations, these modules may be provided for or otherwise operatively arranged using other or additional mechanisms. For example, all or part of the controllers/processors 520-542 may be provided in firmware or as software modules stored in memory 214. Additionally, while in this example the controllers/processors 520-542 are illustrated as being separate modules, it should be recognized that such modules may be combined together as one module or perhaps with other modules, or otherwise further divided into a plurality of sub-modules.

Figure 6:
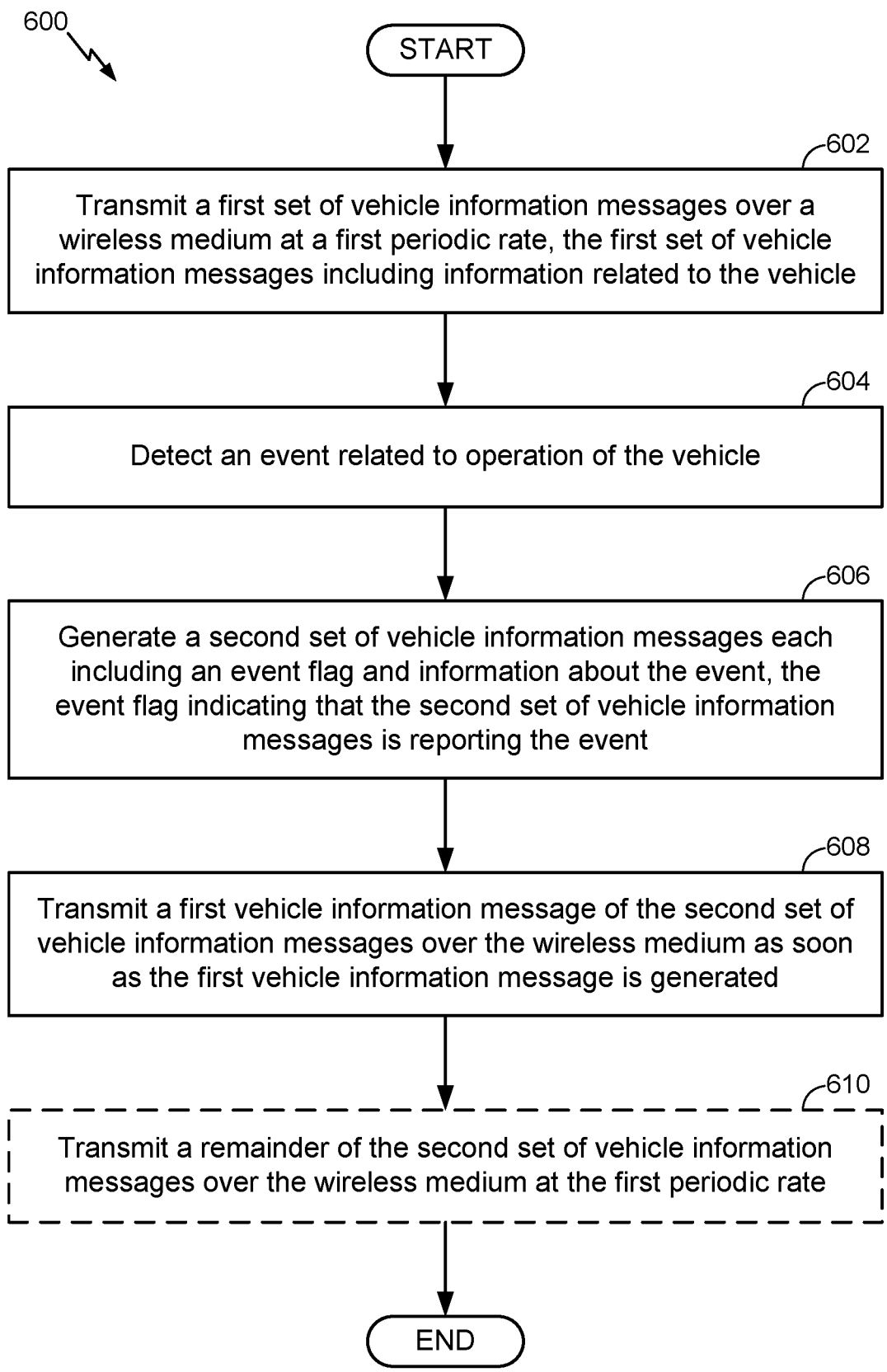
FIG. 6 illustrates an exemplary flow for transmitting vehicle information messages among a plurality of vehicles according to at least one aspect of the disclosure.

FIG. 6 illustrates an exemplary flow for transmitting vehicle information messages among a plurality of vehicles according to at least one aspect of the disclosure. The flow illustrated in FIG. 6 may be performed by the vehicle 200 of FIGS. 2, 5A, and 5B.

At 602, the transceiver 204 of the vehicle 200 transmits a first set of vehicle information messages (e.g., BSMs, CAMs, etc.) over a wireless medium (e.g., medium 132) at a first periodic rate (e.g., every 100 ms). The first set of vehicle information messages may include information related to the vehicle 200, such as the BSM Part I information illustrated in Table 1.

At 604, one or more of sensor(s) 208 detect an event related to operation of the vehicle 200. The event may be a hard braking event, a failure to brake event, an unsignaled lane change event, a failure to follow a traffic signal event, an excessive speed event, and/or any event that may influence the operation of a nearby vehicle (e.g., safety, heading, speed, etc.).

At 606, a processor of the vehicle 200 (e.g., processor 210 and/or quick event processor 520) generates a second set of vehicle information messages (e.g., BSMs, CAMs) each including an event flag (e.g., DE_EventFlag set to "1") and information about the event, such as the BSM Part II information illustrated in Table 1. The event flag may indicate that the second set of vehicle information messages is reporting the event.

At 608, the transceiver 204 transmits a first vehicle information message of the second set of vehicle information messages over the wireless medium as soon as the first vehicle information message is generated.

At 610, the transceiver 204 optionally transmits the remainder of the second set of vehicle information messages over the wireless medium at the first periodic rate. As described herein, the first and second sets of vehicle information messages may be utilized by nearby vehicles for automated vehicle control for emergency intervention, vehicle-to-vehicle (V2V) and/or vehicle-to-infrastructure (V2I) communication for coordination with other vehicles in close-following automated vehicle operation, or any combination thereof.

Figure 7:
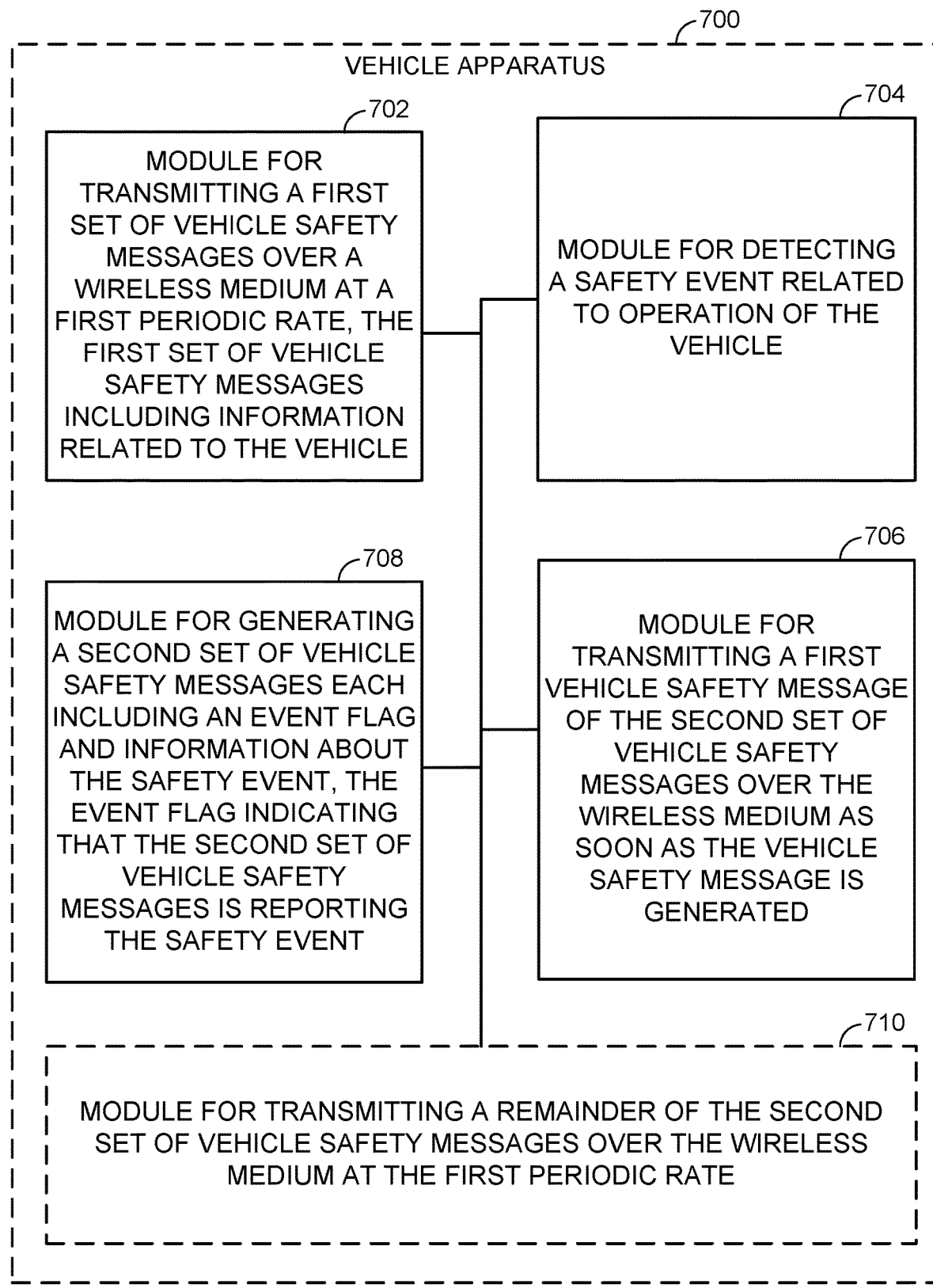
FIG. 7 illustrates an example vehicle apparatus represented as a series of interrelated functional modules according to at least one aspect of the disclosure.

FIG. 7 illustrates an example vehicle apparatus 700 represented as a series of interrelated functional modules. A module for transmitting 702 may correspond at least in some aspects to, for example, a communication device, such as transceiver 204 in FIG. 2, as discussed herein. A module for detecting 704 may correspond at least in some aspects to, for example, one or more sensors, controllers, or processors, such as sensor(s) 208, the collision avoidance/obstacle detection processor 522, the brake controller 524, the throttle controller 526, the steering controller 528, the automated driving processor 532, the sensor and I/O processor 534, the scene tracking processor 536, the map-based road geometry processor 538, and the target path estimation and selection processor 542, as discussed herein. A module for generating 706 may correspond at least in some aspects to, for example, a processing system, such as processor 210 and/or quick event processor 520, as discussed herein. A module for transmitting 708 may correspond at least in some aspects to, for example, a communication device, such as transceiver 204, as discussed herein. An optional module for transmitting 710 may correspond at least in some aspects to, for example, a communication device, such as transceiver 204, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for transmitting vehicle information messages among a plurality of vehicles.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for transmitting vehicle information messages among a plurality of vehicles, comprising:
   transmitting, by a transceiver of a vehicle of the plurality of vehicles, a first set of vehicle information messages over a vehicle communication channel on a wireless medium at a first periodic rate, the first set of vehicle information messages including information related to the vehicle;
   detecting, by one or more sensors of the vehicle, an event related to operation of the vehicle;
   generating, by at least one processor of the vehicle, a second set of vehicle information messages each including an event flag and information about the event, the event flag indicating that the second set of vehicle information messages is reporting the event;
   transmitting, by the transceiver of the vehicle, a first vehicle information message of the second set of vehicle information messages over the vehicle communication channel on the wireless medium either (1) as soon as the wireless medium is available and without waiting for a next transmission opportunity of the first periodic rate or (2) immediately without waiting for the wireless medium to be available; and
   transmitting, by the transceiver of the vehicle, a remainder of the second set of vehicle information messages over the vehicle communication channel on the wireless medium.

2. The method of claim 1, wherein the transceiver of the vehicle transmits the remainder of the second set of vehicle information messages over the vehicle communication channel on the wireless medium at the first periodic rate.

3. The method of claim 1, wherein the transceiver of the vehicle transmits the remainder of the second set of vehicle information messages over the vehicle communication channel on the wireless medium at a higher frequency than the first periodic rate.

4. The method of claim 1, wherein the second set of vehicle information messages each include the same information about the event.

5. The method of claim 1, further comprising:
   repeating transmission of the second set of vehicle information messages up to a threshold number of times to ensure that nearby vehicles receive the second set of vehicle information messages.

6. The method of claim 5, further comprising:
   updating vehicle state information in the second set of vehicle information messages based on a change in state of the vehicle.

7. The method of claim 1, wherein a vehicle information message comprises a Basic Safety Messages (BSM) or a Cooperative Awareness Message (CAM).

8. The method of claim 1, wherein the information related to the vehicle includes a position of the vehicle, an elevation of the vehicle, a position accuracy of the position of the vehicle, a speed of the vehicle, a transmission state of the vehicle, a heading state of the vehicle, a steering wheel angle of the vehicle, an acceleration of the vehicle, a brake system status of the vehicle, a size of the vehicle, or any combination thereof.

9. The method of claim 1, wherein the information about the event includes a path history of the vehicle, a path prediction of the vehicle, or any combination thereof.

10. The method of claim 1, wherein the event related to the operation of the vehicle includes a hard braking event, a failure to brake event, an unsignaled lane change event, a failure to follow a traffic signal event, an excessive speed event, or any combination thereof.

11. The method of claim 1, wherein the first and second sets of vehicle information messages are utilized by nearby ones of the plurality of vehicles for automated vehicle control for emergency intervention, vehicle-to-vehicle (V2V) and/or vehicle-to-infrastructure (V2I) communication for coordination with other vehicles in close-following automated vehicle operation, or any combination thereof.

12. The method of claim 1, wherein the first periodic rate comprises a periodic rate of 100 ms.

13. The method of claim 1, wherein other vehicles of the plurality of vehicles transmit vehicle information messages on the wireless medium at the first periodic rate.

14. The method of claim 13, wherein a gap between vehicle information messages transmitted by the plurality of vehicles corresponds to a highest priority access class specified by Enhanced Distributed Channel Access (EDCA) parameters.

15. The method of claim 1, wherein the plurality of vehicles both transmit and receive vehicle information messages over the vehicle communication channel on the wireless medium.

16. The method of claim 1, wherein the wireless medium comprises a Dedicated Short-Range Communication (DSRC) wireless communication link in a licensed Intelligent Transportation Systems (ITS) band of 5.9 GHz.

17. An apparatus for transmitting vehicle information messages among a plurality of vehicles, comprising:
a transceiver of a vehicle of the plurality of vehicles configured to transmit a first set of vehicle information messages over a vehicle communication channel on a wireless medium at a first periodic rate, the first set of vehicle information messages including information related to the vehicle;
one or more sensors of the vehicle configured to detect an event related to operation of the vehicle; and
at least one processor of the vehicle configured to generate a second set of vehicle information messages each including an event flag and information about the event, the event flag indicating that the second set of vehicle information messages is reporting the event,
wherein the transceiver of the vehicle is further configured to:
transmit a first vehicle information message of the second set of vehicle information messages over the vehicle communication channel on the wireless medium either (1) as soon as the wireless medium is available and without waiting for a next transmission opportunity of the first periodic rate or (2) immediately without waiting for the wireless medium to be available; and transmit a remainder of the second set of vehicle information messages over the vehicle communication channel on the wireless medium.

18. The apparatus of claim 17, wherein the transceiver of the vehicle is configured to transmit the remainder of the second set of vehicle information messages over the vehicle communication channel on the wireless medium at the first periodic rate.

19. The apparatus of claim 17, wherein the transceiver of the vehicle is configured to transmit the remainder of the second set of vehicle information messages over the vehicle communication channel on the wireless medium at a higher frequency than the first periodic rate.

20. The apparatus of claim 17, wherein the second set of vehicle information messages each include the same information about the event.

21. The apparatus of claim 17, wherein the transceiver of the vehicle is further configured to repeat transmission of the second set of vehicle information messages up to a threshold number of times to ensure that nearby vehicles receive the second set of vehicle information messages.

22. The apparatus of claim 21, wherein the at least one processor is further configured to update vehicle state information in the second set of vehicle information messages based on a change in state of the vehicle.

23. The apparatus of claim 17, wherein a vehicle information message comprises a Basic Safety Messages (BSM) or a Cooperative Awareness Message (CAM).

24. The apparatus of claim 17, wherein the information related to the vehicle includes a position of the vehicle, an elevation of the vehicle, a position accuracy of the position of the vehicle, a speed of the vehicle, a transmission state of the vehicle, a heading state of the vehicle, a steering wheel angle of the vehicle, an acceleration of the vehicle, a brake system status of the vehicle, a size of the vehicle, or any combination thereof.

25. The apparatus of claim 17, wherein the information about the event includes a path history of the vehicle, a path prediction of the vehicle, or any combination thereof.

26. The apparatus of claim 17, wherein the event related to the operation of the vehicle includes a hard braking event, a failure to brake event, an unsignaled lane change event, a failure to follow a traffic signal event, an excessive speed event, or any combination thereof.

27. The apparatus of claim 17, wherein the first and second sets of vehicle information messages are utilized by nearby ones of the plurality of vehicles for automated vehicle control for emergency intervention, vehicle-to-vehicle (V2V) and/or vehicle-to-infrastructure (V2I) communication for coordination with other vehicles in close-following automated vehicle operation, or any combination thereof.

28. The apparatus of claim 17, wherein the first periodic rate comprises a periodic rate of 100 ms.

29. The apparatus of claim 17, wherein other vehicles of the plurality of vehicles transmit vehicle information messages on the wireless medium at the first periodic rate.

30. The apparatus of claim 29, wherein a gap between vehicle information messages transmitted by the plurality of vehicles corresponds to a highest priority access class specified by Enhanced Distributed Channel Access (EDCA) parameters.

31. The apparatus of claim 17, wherein the plurality of vehicles both transmit and receive vehicle information messages over the vehicle communication channel on the wireless medium.

32. The apparatus of claim 17, wherein the wireless medium comprises a Dedicated Short-Range Communication (DSRC) wireless communication link in a licensed Intelligent Transportation Systems (ITS) band of 5.9 GHz.

33. An apparatus for transmitting vehicle information messages among a plurality of vehicles, comprising:
- means for transmitting configured to transmit a first set of vehicle information messages over a vehicle communication channel on a wireless medium at a first periodic rate, the first set of vehicle information messages including information related to the vehicle;
- means for sensing configured to detect an event related to operation of the vehicle; and
- means for processing configured to generate a second set of vehicle information messages each including an event flag and information about the event, the event flag indicating that the second set of vehicle information messages is reporting the event,
- wherein the means for transmitting is further configured to:
  - transmit a first vehicle information message of the second set of vehicle information messages over the vehicle communication channel on the wireless medium either (1) as soon as the wireless medium is available and without waiting for a next transmission opportunity of the first periodic rate or (2) immediately without waiting for the wireless medium to be available; and
  - transmit a remainder of the second set of vehicle information messages over the vehicle communication channel on the wireless medium.

34. A non-transitory computer-readable medium storing computer executable code for transmitting vehicle information messages among a plurality of vehicles, comprising code to:
- cause a transceiver of a vehicle of the plurality of vehicles to transmit a first set of vehicle information messages over a vehicle communication channel on a wireless medium at a first periodic rate, the first set of vehicle information messages including information related to the vehicle;
- cause one or more sensors of the vehicle to report an event related to operation of the vehicle;
- cause at least one processor of the vehicle to generate a second set of vehicle information messages each including an event flag and information about the event, the event flag indicating that the second set of vehicle information messages is reporting the event;
- cause the transceiver of the vehicle to transmit a first vehicle information message of the second set of vehicle information messages over the vehicle communication channel on the wireless medium either (1) as soon as the wireless medium is available and without waiting for a next transmission opportunity of the first periodic rate or (2) immediately without waiting for the wireless medium to be available; and
- cause the transceiver of the vehicle to transmit a remainder of the second set of vehicle information messages over the vehicle communication channel on the wireless medium.

\* \* \* \* \*